June 26, 1934.    C. S. BROWN    1,964,106
MULTICYLINDER BLOCK FOR AIR COOLED ENGINES
Filed Nov. 5, 1931
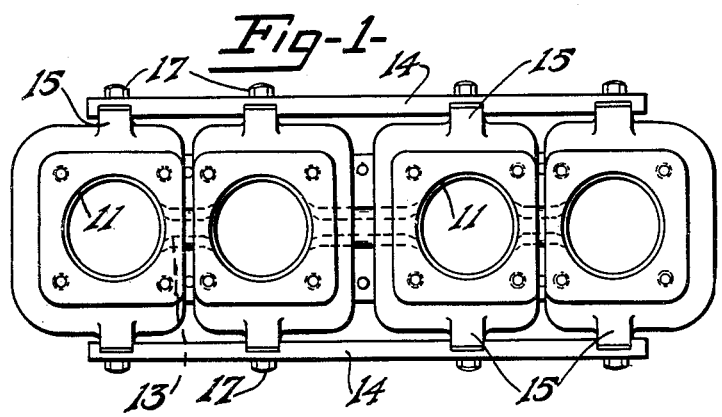
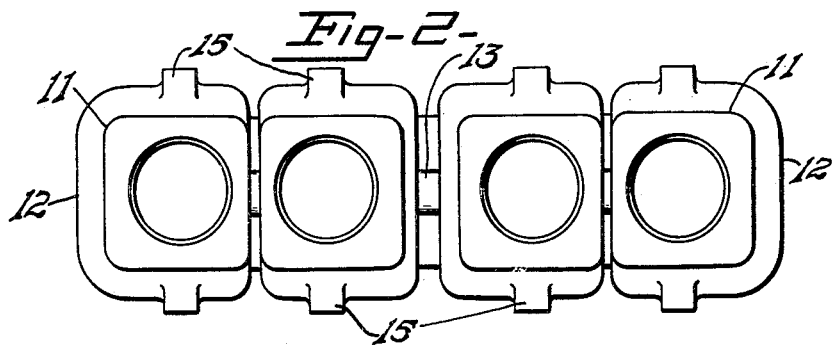
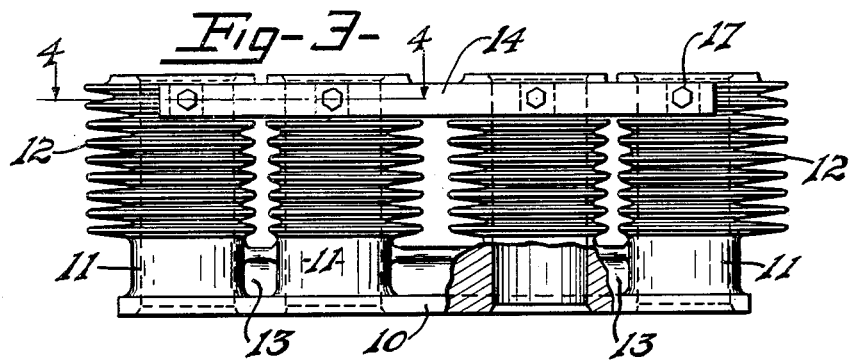
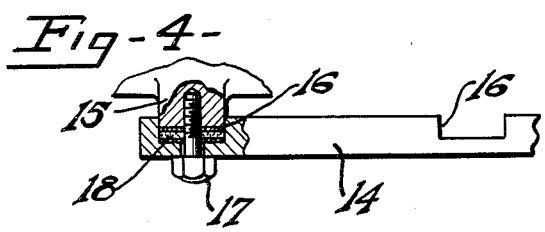
INVENTOR
Charles S. Brown
BY Bodell + Thompson
ATTORNEYS Patented June 26, 1934

1,964,106

UNITED STATES PATENT OFFICE 1,964,106

MULTICYLINDER BLOCK FOR AIR COOLED ENGINES

Charles S. Brown, Syracuse, N. Y.

Application November 5, 1931, Serial No. 573,127

13 Claims. (Cl. 123—171)

This invention relates to multi-cylinder engine blocks for air cooled engines, and has for its object, a particularly simple and efficient means for holding the cylinders in juxtaposition during the machining operations performed on the cylinders, and during the operation of the engine.

The invention consists in the novel features and in the combinations and constructions hereinafter set forth and claimed.

In describing this invention, reference is had to the accompanying drawing, in which like characters designate corresponding parts in all the views.

Figure 1 is a plan view on an engine block embodying this invention.

Figure 2 is a plan view with the top bars removed.

Figure 3 is a side elevation.

Figure 4 is an enlarged, sectional view on line 4—4, Figure 3.

In air cooled engines, because it is necessary to circulate air around the cylinders individually, it has not been thought practical to cast a plurality of cylinders en-bloc. Also, because air cooled cylinders are subject to greater variations in temperature than water cooled engines, the cylinders can not be connected together by masses of metal, as in water cooled engines, because variations in expansion and contraction of the masses of metal in air cooled engines being greater due to greater variation in temperature in various parts of the cylinders cause misalinements, or distortion of the cylinders relatively to each other, in the normal use of the engine.

The object of this invention is an air cooled cylinder construction by which a plurality of air cooled cylinders can be machined and assembled in the engine as a unit.

This air cooled multi-cylinder block here illustrated is of the type in which the cylinder heads are detachable and comprises a base 10 common to a plurality of cylinders 11 and integral therewith, and tie bars connecting the cylinders and spaced apart therefrom, except where they are attached to the cylinders. The cylinders are provided with suitable heat radiating flanges 12 around their upper portions, and with rigid connections 13 connecting adjacent cylinders along the base 10, these rigid connections preferably extending along the median plane of the cylinders, that is, the plane containing the axes of all the cylinders. The connections, as here shown, are T shaped in general form in cross section.

14 are the tie bars connecting the cylinders, these bars extending on opposite sides of the head ends of the block of cylinders parallel to planes tangent to the cylinders or to the outer sides thereof.

In the illustrated embodiment of the invention, the cylinders are formed with lugs 15 on opposite sides thereof, and the bars 14 are secured to the lugs and preferably detachably secured thereto. As shown, the bars are provided with notches 16 for receiving the lugs, the bars being secured to the lugs 15 in any suitable manner, as by screws 17. The lugs 15 and notches 16 are preferably square or rectangular and are closely fitted together. Owing to this construction the bars or tie rods and the cylinders are rigidly secured together against relative movement. Preferably, heat insulating joints are provided between the lugs 15 and the bars 14, and as here shown, gaskets 18 of heat insulating material, as asbestos, are interposed between the lugs and the bars. The bars are preferably of a different metal than the cylinders and are usually steel or invar or any other metal having an extremely low coefficient of expansion.

The base 10 and the cylinders 11 with the flanges 12 and lugs 15 are first cast as a unit and then, the lugs machined or trimmed to fit the notches in the bars 14, which bars are attached after the cylinders are cast. The bars 14 hold the cylinders in alinement during the boring of the cylinders and the surfacing of the head ends of the cylinders for receiving the cylinder heads. Also, the bars are left on the cylinders after the cylinders are machined to hold the cylinders from misalinement and to brace the entire block. Owing to the heat insulating joints between the cylinders and the bars 14, and to the relatively small mass of the bars and the spacing of the bars from the cylinders, the bars are not heated by conduction of heat from the cylinders and hence, the cylinders are not affected by distortion of the bars due to heating of the bars. If the bars are made of invar, they will not expand even if heated.

What I claim is:

1. A multi-cylinder block for air cooled engines including a plurality of spaced apart cylinders, a base common to the cylinders and integral therewith, and tie bars connecting the head ends of the cylinders, said tie bars extending lengthwise of opposite sides of the block of cylinders and spaced apart from the cylinders between their points of connection to the cylinders.

2. A multiple cylinder block for air cooled engines including a plurality of spaced cylinders which are independent of each other, and tie bars connecting the cylinders and holding them together as a unit or block, the tie bars extending along opposite sides of the block cylinders and connected to the cylinders at points substantially tangent thereto, and being spaced apart from the cylinders between the points at which they are connected to the cylinders.

3. A multi-cylinder block for air cooled engines including cylinders formed with laterally extending lugs, and tie bars connecting the cylinders together and secured to the lugs.

4. A multi-cylinder block for air cooled engines including cylinders formed with laterally extending lugs, tie bars connecting the cylinders together and secured to the lugs, and heat insulating joints between the cylinders and the tie bars.

5. A multi-cylinder block for air cooled engines including a plurality of spaced cylinders formed with laterally extending lugs, tie bars connecting the cylinders together and secured to the lugs, heat insulating joints between the lugs and the tie bars, said tie bars extending along opposite sides of the cylinders parallel to planes tangent to the cylinders and spaced apart from the cylinders between the points at which they are secured to the cylinders.

6. A multi-cylinder block for air cooled engines including a plurality of spaced cylinders having laterally extending lugs on opposite sides thereof, and tie bars connecting the cylinders and having notches for receiving the lugs.

7. A multi-cylinder block for air cooled engines including a plurality of spaced cylinders having laterally extending lugs on opposite sides thereof, and tie bars connecting the cylinders and having notches for receiving the lugs, and heat insulating joints between the lugs and the bars.

8. A multi-cylinder block for air cooled engines including a plurality of spaced apart cylinders, a base common to the cylinders and integral therewith, the cylinders having laterally extending lugs at their outer ends, and tie bars extending along opposite sides of the block cylinders and secured to said lugs.

9. A multi-cylinder block for air cooled engines comprising a plurality of cylinders, a base common to the cylinders and integral therewith, the cylinders having laterally extending lugs at their outer ends, and tie bars extending along opposite sides of the cylinders and secured to said lugs, the lugs and the tie bars being connected by heat insulating joints.

10. A multi-cylinder block for air cooled engines including spaced apart cylinders, a base common to the cylinders and integral therewith and tie-bar means connecting the cylinders and located at one side of a plane containing the axes of the cylinders, whereby the tie-bar means extends in a general direction tangential to the cylinders, said tie-bar means being joined to adjacent cylinders and spaced apart from the cylinders and other parts of the engine between the points where it is joined to the cylinders.

11. A multi-cylinder block for air cooled engines including a plurality of spaced apart cylinders, a base common to the cylinders and integral therewith, a tie-bar connecting the head ends of the cylinders and located on one side of the cylinders and extending lengthwise of the cylinder block, the tie-bar being spaced apart from the cylinders between the points of connection to the cylinders.

12. A multi-cylinder block for air cooled engines including a plurality of spaced apart cylinders and means for holding the cylinders in the block including tie-bar means connecting the cylinders and extending on opposite sides of the block and joined to the cylinders and spaced apart from the cylinders between their points of connection to the cylinders.

13. A multi-cylinder block for air cooled engines including a plurality of spaced apart cylinders and means for holding the cylinders in the block including tie-bar means connecting the cylinders and extending on opposite sides of the block and joined to the cylinders and spaced apart from the cylinders between their points of connection to the cylinders, said tie-bar means being of a metal having a different coefficient of expansion than the metal of the cylinders.

CHAS. S. BROWN.